(12) United States Patent
De Boer et al.

(10) Patent No.: US 7,756,009 B1
(45) Date of Patent: Jul. 13, 2010

(54) METHOD AND APPARATUS FOR PRIORITY CALL SETUP AND RESTORATION IN AN OPTICAL COMMUNICATIONS SYSTEM

(75) Inventors: Evert De Boer, Nepean (CA); Mark Gibbon, Whetstone (GB); Jean-Pierre Coupal, Gatineau (CA); Darek Skalecki, Kanata (CA)

(73) Assignee: Ciena Corporation, Linthicum, MD (US)

( * ) Notice: Subject to any disclaimer, the term of this patent is extended or adjusted under 35 U.S.C. 154(b) by 1652 days.

(21) Appl. No.: 10/979,655

(22) Filed: Nov. 1, 2004

(51) Int. Cl.
*H04L 12/26* (2006.01)
*H04J 14/00* (2006.01)
*G06F 11/20* (2006.01)

(52) U.S. Cl. .................. 370/216; 370/255; 370/409; 398/1; 398/58; 714/4

(58) Field of Classification Search ............. 370/216, 370/255, 409; 398/1, 58; 714/4
See application file for complete search history.

(56) References Cited

U.S. PATENT DOCUMENTS

| | | | |
|---|---|---|---|
| 6,530,032 B1 * | 3/2003 | Shew et al. | 714/4 |
| 6,594,265 B1 * | 7/2003 | Etorre et al. | 370/395.51 |
| 6,826,189 B1 * | 11/2004 | Saito | 370/397 |
| 6,856,627 B2 * | 2/2005 | Saleh et al. | 370/397 |
| 6,904,054 B1 * | 6/2005 | Baum et al. | 370/467 |
| 6,912,221 B1 * | 6/2005 | Zadikian et al. | 370/395.21 |
| 6,956,821 B2 * | 10/2005 | Szviatovszki et al. | 370/237 |
| 6,970,921 B1 * | 11/2005 | Wang et al. | 709/220 |
| 7,054,557 B1 * | 5/2006 | Dasylva et al. | 398/48 |
| 7,298,704 B2 * | 11/2007 | Kodialam et al. | 370/238 |
| 7,499,649 B2 * | 3/2009 | Cinkler | 398/47 |
| 2003/0117950 A1 * | 6/2003 | Huang | 370/220 |
| 2004/0076166 A1 * | 4/2004 | Patenaude | 370/401 |
| 2005/0036442 A1 * | 2/2005 | Saleh et al. | 370/216 |

* cited by examiner

*Primary Examiner*—Alpus H Hsu
(74) *Attorney, Agent, or Firm*—Christopher & Weisberg, P.A.

(57) ABSTRACT

A call setup and restoration schema is disclosed for providing an improved priority-based call setup and restoration schema in an optical communications system, allowing higher priority connections access to bandwidth by user-definable parameters. The call setup and restoration schema includes allowing higher priority connections to claim the resources of lower priority connections, and restoring them when bandwidth is available, or bumping another, even lower priority, connections. This aids in providing access to bandwidth by high priority services and in preventing outages or connection delays for high priority connections.

13 Claims, 4 Drawing Sheets

FIGURE 5C

METHOD AND APPARATUS FOR PRIORITY CALL SETUP AND RESTORATION IN AN OPTICAL COMMUNICATIONS SYSTEM

FIELD OF THE INVENTION

The present invention relates to call setup and restoration in an optical communications network and is particularly concerned with a priority connection architecture for an optical communications system.

BACKGROUND OF THE INVENTION

Currently, methods and apparatuses exist for restoration in an optical communications system and priority for call setup, usually based upon the Class of Service (CoS). A disadvantage of this type of restoration in an optical communications system may be that low priority connections are maintained at the cost of disallowing higher priority connections access to bandwidth.

For many connections, an optical network can be required to provide reliability comparable to electric telephony networks, especially in the face of major network failures. Typically, the service offered is a reliable optical connection between a pair of nodes where service disruptions can be minimized by quickly re-establishing or restoring the optical connections through an alternate path. Another concern is access to the required bandwidth. As more demand is placed upon the bandwidth resources of an optical network, the effect of failed connections or delayed connections increases.

Traditionally, networks allocate bandwidth and resources for the transmission of data and assign certain priorities to data paths such as Quality of Service (QoS) and like. A user can configure the priority of the path, in order to guarantee that a certain CoS is restored more quickly than another-CoS.

Ring topologies are able to quickly restore circuits. This capability is important to provide reliable service to customers, and is particularly important in telephony applications, where failures and delays ultimately lead to customer dissatisfaction. As well, bandwidth allocated to restoration, provisioning and other functions may assume a large proportion of the available bandwidth.

Mesh technologies reduce the amount of bandwidth required for protection. Mesh technology is a point-to-point technology, with each node coupled to one or more nodes in the network. A connection may be routed through various nodes and the links connecting them. Excess capacity through a given node or link can protect several circuits, reducing the need for reserved bandwidth.

Each of the various connections on a network also have their own requirements as to bandwidth, restoration time, restoration guarantees and so on. Certain low-priority connections may have only minimum requirements, so call setup, restoration, and maintenance of that connection may only consist of waiting until sufficient bandwidth is available, allowing this service to be economically priced. At the other end of the spectrum, certain high priority connections require precedence for call setup, restoration and maintaining that connection. Other connections generally lie in the middle of the spectrum, where reasonable uptime and an economical cost is desired.

In view of the foregoing, it would be desirable to provide a technique for a priority-based call setup and restoration in an optical communications system which overcomes the above-described inadequacies and shortcomings by providing a mechanism which does not only provide swift setup and restoration time, but allows higher priority connections access to bandwidth by bumping lower priority connections, and then restoring those lower priority connections as bandwidth becomes available.

SUMMARY OF THE INVENTION

An object of the present invention is to provide an improved priority-based call setup and restoration schema in an optical communications system, allowing higher priority connections access to bandwidth by user-definable parameters.

According to an aspect of the present invention there is provided a method for establishing, in an optical network having a plurality of physical paths between a plurality of nodes and a first virtual path (VP) with a first associated priority comprising at least one connection between a head node and an end node running on a first physical path in said optical network, a second VP having a second associated priority, the method having the steps of (a) Identifying a second physical path, wherein the second physical path is one of said plurality of physical paths, the second physical path is between a first node and a second node of the nodes, the second physical path comprises the at least one connection, and the second associated priority is greater than said first associated priority. Then, (b) bumping the at least one connection, and (c) allocating the at least one connection to the second VP.

Advantages of the present invention include access to bandwidth by high priority services, and preventing outages or connection delays for high priority connections. This is done by allowing higher priority connections to claim the resources of lower priority connections, herein called bumping, and restoring them when bandwidth is available, or bumping another, even lower priority, connection.

Conveniently the associated second priority comprises a priority profile, wherein the priority profile comprises a plurality of priority types, and the priority type comprises a plurality of priority levels. Also conveniently, the priority types include at least one of a connection priority type or a hold priority type. In some embodiments, the connection priority may comprise one of the group of Call Setup Priority (CSP) and Call Restoration Priority (CRP). As well, in some embodiments, the hold priority my comprise one of the group of Call Hold Nominal Path Priority (CHNP) and Call Hold Restoration Priority (CHRP).

Conveniently, the step of identifying a physical path may use a path selection algorithm. In some embodiments, the path selection algorithm may be Dijkstra's algorithm.

Also conveniently, the allocating step may further have the steps of claiming at least one connection for the second VP, and flooding information regarding the at least one connection to the plurality of nodes.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which.

DETAILED DESCRIPTION

Numerous modifications, variations and adaptations may be made to the particular embodiments of the invention described below without departing from the scope of the invention, which is defined in the claims.

Figure 1:
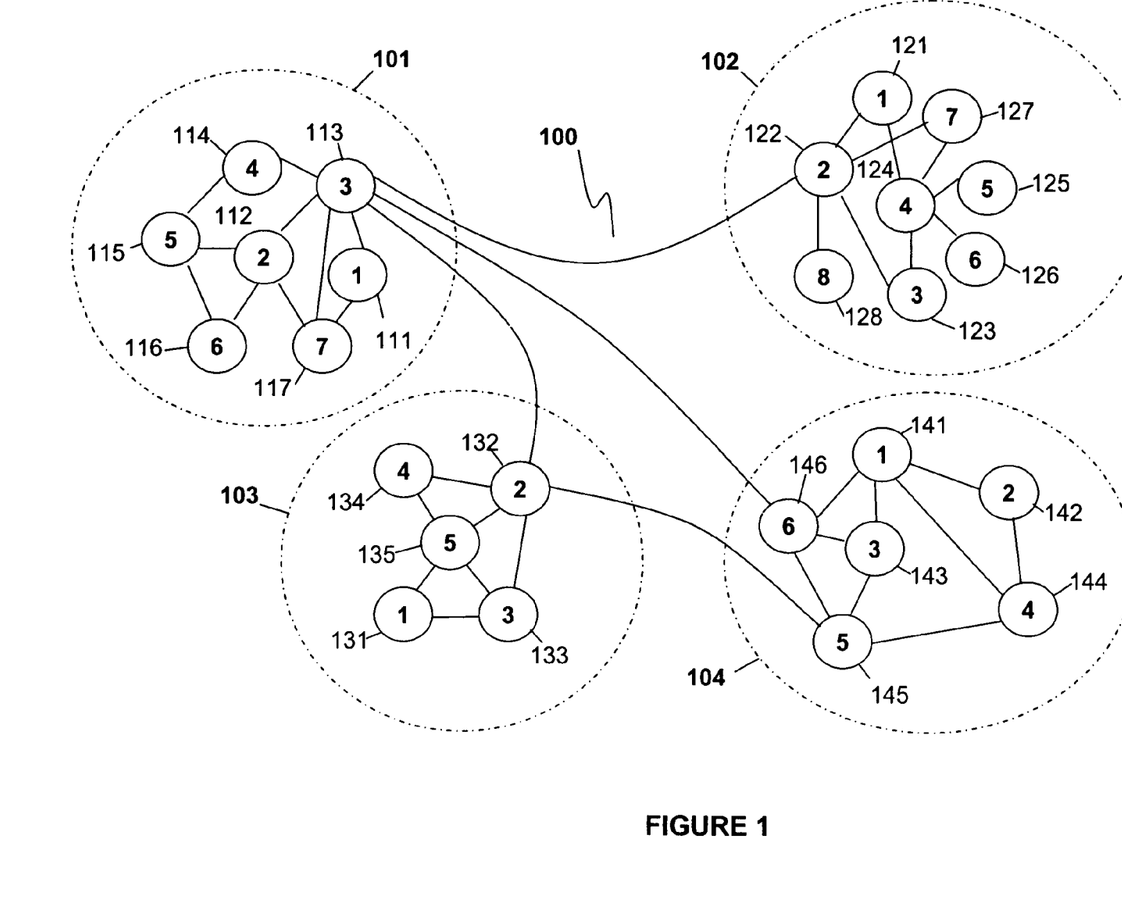
FIG. 1 is a block diagram of a zoned network according to an embodiment of the invention.

FIG. 1 illustrates an example of a zoned mesh network. This network may also be configured as a non-zoned mesh network. The exemplary zoned network is divided into a backbone zone 100, and four configured zones, zones 101-104. The solid circles in each zone represent network nodes, including 111-117, 121-128, 131-135, and 141-146; while the numbers within the circles represent node addresses. The dashed circles represent network zones, zones 101-104. Network nodes 113, 122, 132, 145, and 146 are defined herein as boundary nodes because they connect to more than one zone, and may act as proxy nodes. All other nodes are interior nodes, since they are not attached to other zones. This network may be configured in a different manner than illustrated in FIG. 1, such as a non-zoned network, where all nodes are combined into a single network with no boundary or proxy nodes.

In operation, once the mesh network has been defined, for example the topology in FIG. 1, the user may configure end-to-end connections spanning multiple nodes and/or zones. This process is called provisioning. For each path to be provisioned, a physical path must be selected and configured. Each set of physical connections that are provisioned creates an end-to-end connection between the two end nodes that supports a virtual point-to-point link, or in other words, a VP. VPs may be assigned statically or dynamically, as required by the user. This VP has an associated capacity, operational state, other attributes, and by an embodiment of this invention, priority values.

Priority Values

In one embodiment of the invention, four priorities are assigned to priority profiles, where each priority profile represents a priority schema as assigned by the network operator. At call setup time, the path will be associated with a priority profile as part of the call setup parameters. The connections of a call will obtain the priorities as per the assigned priority profile and will keep these priorities for the life of the call. However the priorities assigned at call setup, can be edited when required. If connections of a call need to be restored, then the restored connection will obtain the same priorities as per the original assigned priority profile.

In one aspect of the invention, the new connection's CSP is compared to the CHNP or CHRP of connections already in place. As will be discussed later, a new connection setup normally does not bump another connection from its nominal path, i.e. the path the network operator chooses as being the most optimum path. In one aspect of the invention, the restored connection's CRP is compared to the CHNP or CHRP of connections already in place.

In one embodiment of the invention, connections of each call will have priority profiles assigned during setup to the VP. These priorities include a connection setup priority (CSP) used when the connection is being created, a connection restoration priority (CRP) used when the connection is being restored, a connection hold nominal path priority (CHNP) used when on the nominal path, and a connection hold restoration path priority (CHRP) used when on the restoration path. In this version, ASTN signalling allows for eight (8) priority levels, with 0 being the highest priority and 7 being the lowest.

Example of Priority Profile Settings

When a call is setup, a priority profile is assigned to the call. This priority profile provides a mapping to pre-defined settings of the four priorities. Although one skilled in the art can see that a very large number of profiles may be constructed, it is anticipated that for network management purposes, the number of profiles remains small. A large number of profiles increase the complexity of understanding the relationship between the priority profiles and the call behavior in the network including connection setup and connection restoration activities.

The following Table 0 is an example of five profiles of priority settings. An Automatic Protection Setting (APS) CoS connection is setup with priority profile 1, an Shared Mesh (SM) CoS connection with priority profile 2, an Unprotected CoS with priority profile 3 and another Unprotected connection with a lower priority level in profile 4. An Extra Traffic connection with default priorities, a Shared Mesh tunnel, a Forced Restoration and a Manual Restoration has been added as well for comparison.

TABLE 0

Example of a Priority Profile Table

| Priority profile | CSP | CHNP | CRP | CHRP | Comment |
|---|---|---|---|---|---|
| 0 | 0 | 0 | 0 | 0 | Emergency Service |
| 1 | 2 | 1 | 1 | 1 | APS CoS connection |
| 2 | 4 | 1 | 3 | 3 | SM CoS connection |
| 3 | 6 | 1 | 5 | 5 | Unprotected CoS connection |
| 4 | 7 | 7 | 7 | 7 | Unprotected CoS connection with lower CHNP priority. |
|  | 7 | 7 | 7 | 7 | Extra Traffic (ET) |
|  | 2 |  | n/a |  | Shared Mesh tunnel |
|  |  | n/a | 0 | 0 | Forced Restoration |
|  |  | n/a | 7 | CHRP of connection | Manual Restoration - using CHRP of connection allows for low priority manual restoration. It guarantees the same hold priority as the original connection. |

Note that equal priorities will not cause bumping. Profile 0 is only to be used for emergency situations. A new call setup using this profile will bump any other connections with priority 1-7 and this new call will obtain the highest restoration priority. It can never be bumped. The priority levels above are chosen to create a hierarchical order in priority profiles: profile 0 connections will be restored before any other profile. Profile before 1 before profile 2, 3, 4, etc.

The CSP of profiles 1 to 3 have a lower priority than the CRP of the same priority profiles. This gives the restoration of these connections in that priority profile the advantage over connection setup. In general a network operator wants to ensure that restoration attempts of existing connections in the same priority profile have priority over new call setup attempts of that same priority profile.

Connection setup of a higher order profile will be able to pre-empt restored connections of lower order priority profiles because its CSP priority is higher than the CHRP. For instance setup of a priority profile 1 connection can pre-empt a restored profile 2 connection.

Similarly, restoration of a connection of higher order profile will be able to pre-empt a restored connection of a lower order profile because its CRP priority is higher then the CHRP. For instance restoration of a profile 1 connection can pre-empt a restored profile 2 connection. Profile 4 has a CHNP of 7. This allows new connection setup or connection restoration using priority profile 0, 1, 2 and 3 to bump connections of priority profile 4, while they are on their nominal path. Effectively, a connection with priorities as per priority profile 4 is similar to a Pre-emptable CoS. There is a significant difference though. Normally pre-emptable CoS can only be pre-empted by restoration attempts. In the embodiment of the invention discussed here, in a profile 4 connection can be bumped by new call setup as well as call restoration, when using the priority values as per the table above.

Except profile 0 and 4, all profiles have a CHNP defined as 1. This means that a connection on its nominal path can not be bumped by any new connection or restoration attempt. It can only be bumped by a new connection with a CSP of 0 or a restoration attempt with a CRP of 0, which in this embodiment is reserved for emergency use by the network operator. A restoration attempt with CRP=0 can also be achieved using the Forced Restoration.

ET can only be bumped by a restoration attempt of another CoS. A connection with another CoS than ET will by design never use protection b/w for its connection setup; only for restoration attempts.

Shared Mesh

In the network case where a Shared Mesh tunnel is setup, a CSP needs to be defined with the setup request to ensure proper routing and use of priorities. However, since a Shared Mesh tunnel by design cannot be pre-empted nor can it be restored, the CHNP and CHRP associated with a Shared Mesh tunnel will be set to 0 and the CRP will be set to 7 or in some contemplated embodiments as opposed to the lowest have a N/A to expedite calculation.

Forced Restoration

In a contemplated embodiment, there is a Forced Restoration command, where the default values of CRP and CHRP for the Forced Restoration command are at the highest level. The Forced Restoration command is only involved with a restoration of a connection; hence the CSP and CHNP are not required. The use of the highest priority must of course be used very carefully. Another alternative embodiment of this invention would be to have the Forced restoration take on the same priority of the connection it is force restoring. This would then mean that a Forced Restored connection with a low priority can be bumped by a restoration attempt of a connection with a higher priority, which is not consistent use of the Forced Release command. Some network operators may choose to have Forced Restoration take on the default or operator provided priorities.

Manual Restoration

Under a contemplated embodiment, there is a Manual Restoration is a new command with default values of CRP and CHRP equal to 7. The Manual Restoration command is only involved with a restoration of a connection; hence the CSP and CHNP are not required. This command gives the network operator the flexibility to restore a connection with a low priority to allow for bumping of the manual restored connection. Under another embodiment, an option would be not to introduce the Manual Restoration command but expect the network operator to set the appropriate priority levels when the Forced Restoration command is executed. Some network operators may prefer the Manual Restoration command, since the Manual Restoration command gives a clear indication that the restoration attempt is of a low priority. The network operator is already familiar with Forced command being of higher priority then Manual command.

When a connection is restored as a result of a Forced or Manual command, then the restored path will temporarily use the CRP and CHRP provided by with the Forced and Manual commands and not the CRP and CHRP associated with the connection. When non-revertive switching is introduced, it must be determined at that time whether a Manual or Forced Restoration command results in: a new nominal path, obtaining the priorities of the call where the user command shall not be active after it is executed; or a restoration path, obtaining the priorities as per the user Manual or Forced command where the command becomes active and needs to be released through a user command.

When a Forced Restoration or Manual Restoration results in the bumping of a connection, then the network operator should be warned before the bumping is executed. This means that the path needs to be reserved and the next bumping must be confirmed by the operator before the actual bumping is done. The operator shall also be able to find out which connection will be bumped to assess the impact of his/her action.

Priority Settings

This is merely an example of priority settings. One skilled in the art can understand that many combinations can be defined. In general the priority profile definition should ensure that connection bumping and prioritized restoration will not result in an unstable network, where a situation is created such that connections keep bumping each other in an endless loop.

In general, one skilled in the art would wish to define priority values in order to have certain priority profiles representing VPs with more important service requirements, and some VPs with more cost effective service options. One skilled in the art would recognize there are many ways to determine these priority profile settings.

In one embodiment of the invention, the CRP priority is equal or lower priority then the CHNP and CHRP of its own priority profile. Similarly, the CSP priority is equal or lower priority then the CHNP and CHRP of its own priority profile. This should prevent uncontrolled bumping in the network.

Another aspect of the invention is to have the CSP equal or lower then the CHNP only and the CRP equal or lower than the CHRP only. In that case a new connection cannot bump a connection in the same protection group and on its nominal path, but can bump a restored connection in the same protection group. The same is true for a restoration attempt; it can bump a connection on its nominal path, but not on its restoration path and in the same protection group.

Bandwidth Flooding

Bandwidth is flooded in bundles per CoS. Hence, as in the embodiment depicted in FIG. 2, the bandwidth between node 301, and node 302 is bundled in 10 G for APS protected bandwidth, and 20 G for unprotected bandwidth. Table 1 demonstrates what is being flooded by nodes 301 and 302 for available bandwidth on the link 303 when there is no connection between the two. The numbers in the cells under STSxc indicate the number of connections available of that STS size.

TABLE 1

Available bandwidth when there is no link

| Priority | STS3c | STS12c | STS48c | STS192c |
|---|---|---|---|---|
| APS bundle | | | | |
| 0 | 64 | 16 | 4 | 1 |
| 1 | 64 | 16 | 4 | 1 |
| 2 | 64 | 16 | 4 | 1 |
| 3 | 64 | 16 | 4 | 1 |
| 4 | 64 | 16 | 4 | 1 |
| 5 | 64 | 16 | 4 | 1 |
| 6 | 64 | 16 | 4 | 1 |
| 7 | 64 | 16 | 4 | 1 |
| Unprotected bundle | | | | |
| 0 | 128 | 32 | 8 | 2 |
| 1 | 128 | 32 | 8 | 2 |
| 2 | 128 | 32 | 8 | 2 |
| 3 | 128 | 32 | 8 | 2 |
| 4 | 128 | 32 | 8 | 2 |
| 5 | 128 | 32 | 8 | 2 |
| 6 | 128 | 32 | 8 | 2 |
| 7 | 128 | 32 | 8 | 2 |

Figure 2:
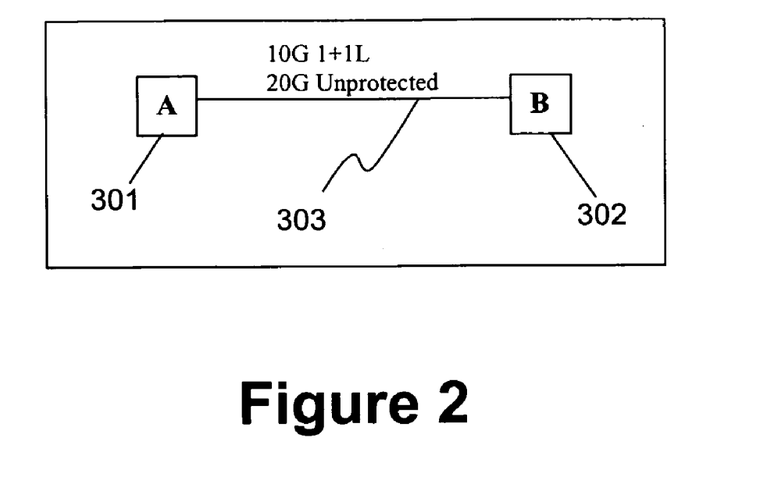
FIG. 2 is a block diagram of a pair of interconnected nodes according to an embodiment of the invention.

Assume one STS12c APS connection with a CSP priority of 2 is restored to the protected bandwidth on link 303. The table will then look as follows in Table 2.

TABLE 2

Available bandwidth once an STS12c connection is applied with CSP = 2

| Priority | STS3c | STS12c | STS48c | STS192c |
|---|---|---|---|---|
| APS bundle | | | | |
| 0 | 64 | 16 | 4 | 1 |
| 1 | 64 | 16 | 4 | 1 |
| 2 | 60 | 15 | 3 | 0 |
| 3 | 60 | 15 | 3 | 0 |
| 4 | 60 | 15 | 3 | 0 |
| 5 | 60 | 15 | 3 | 0 |
| 6 | 60 | 15 | 3 | 0 |
| 7 | 60 | 15 | 3 | 0 |
| Unprotected bundle | | | | |
| 0 | 128 | 32 | 8 | 2 |
| 1 | 128 | 32 | 8 | 2 |
| 2 | 128 | 32 | 8 | 2 |
| 3 | 128 | 32 | 8 | 2 |
| 4 | 128 | 32 | 8 | 2 |
| 5 | 128 | 32 | 8 | 2 |
| 6 | 128 | 32 | 8 | 2 |
| 7 | 128 | 32 | 8 | 2 |

After adding one connection, the number of available connections has decreased for priority levels 2 and lower. However, the available bandwidth for priority levels 0 and 1 are not decreased, because that bandwidth is available by bumping the lower priority connection.

Bumping

In traditional transmission systems a connection, once established, will be on its nominal path under non-failure scenarios. Under failure scenarios the connection may be temporarily switched to a protection path or to a restoration path. Switching to a protection path is not further discussed, since a connection on a protection path maintains its CHNP or CHRP. Extra Traffic will be dropped by a protection switch. It subsequently can be restored. This could mean that restoration of an Extra Traffic connection could bump another restored APS connection.

At least two types of bumping may be used. These are "bump when necessary" and "bump to obtain best route" methods. The difference is that "bump when necessary" will exhaust all possible routes within the parameters of the connection set-up or restoration attempt before bumping a connection. By contrast, "bump to obtain best route" will bump connections to obtain the shortest path if the best route is not available.

"Bump when necessary" is the default used for connection setup and for all restoration purposes. This means that a connection may be routed over a less optimum path, since it will only bump a connection when it cannot find a path with unused bandwidth.

Using the above example illustrated in Table 2 and FIG. 2, assume head node 301, needs to calculate a new route X, for example a STS192c APS CoS with a CSP of 1 and "bump when necessary" option. Using Dijkstra's algorithm, or another routing algorithm, the head node will first include the bandwidth associated with priority hold value of 7, which in this case is the CHRP. In this situation, there is no bandwidth available at priority level 7 on link 303, and assuming there is no bandwidth available on the entire ASTN network at priority level 7, the head-node 301 will continue to run the route calculating algorithm with decreasing priority values until it finds an available route. Assuming there is no bandwidth available on the network for any priority value from 7 up to 2, node 301, will run the routing calculation with a priority level of 1. Now a path is available on link 303. Using this method, the connection with the lower priority value will be bumped first, preventing a domino effect where bumped connections subsequently bump other connections. This calculation will only be done up to the CSP or CRP value.

The network operator will likely choose to use "Bump to obtain best route" when a new connection is requested and it must be routed over the most optimum path.

Using the example illustrated in Table 2 and FIG. 2, when a head-end node 301 needs to calculate a new route X, here a STS192c APS CoS with a CSP of 1 and a "bump to obtain best route" option, then the routing algorithm at the head end node will immediately include bandwidth with a priority level of 1, the same as the CSP or CRP. If the shortest path is from node 301 to node 302, then connections on link 303 will be bumped.

Both of the above bumping methods will result in bumping the STS12c APS connection, resulting in Table 3.

TABLE 3

Results after bumping connection 303

| Priority | STS3c | STS12c | STS48c | STS192c |
|---|---|---|---|---|
| APS bundle | | | | |
| 0 | 64 | 16 | 4 | 1 |
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| Unprotected bundle | | | | |
| 0 | 96 | 32 | 8 | 2 |
| 1 | 96 | 32 | 8 | 2 |
| 2 | 96 | 32 | 8 | 2 |
| 3 | 96 | 32 | 8 | 2 |
| 4 | 96 | 32 | 8 | 2 |
| 5 | 96 | 32 | 8 | 2 |

TABLE 3-continued

Results after bumping connection 303

| Priority | STS3c | STS12c | STS48c | STS192c |
|---|---|---|---|---|
| 6 | 96 | 32 | 8 | 2 |
| 7 | 96 | 32 | 8 | 2 |

Under certain conditions, a problem may occur with race conditions when bumping, and therefore, the routing software should make use of an identifier called a "bumping priority". Using the example above, assume a connection Y with priority level 0 has been put in place on link 303 before the other connection could send its reservation request to node 301, or be set up. The following table would result, with connection Y established and connection X attempting to be established:

TABLE 4

Another request received with Priority level 0

| Priority | STS3c | STS12c | STS48c | STS192c |
|---|---|---|---|---|
| APS bundle | | | | |
| 0 | 0 | 0 | 0 | 0 |
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| Unprotected bundle | | | | |
| 0 | 96 | 32 | 8 | 2 |
| 1 | 96 | 32 | 8 | 2 |
| 2 | 96 | 32 | 8 | 2 |
| 3 | 96 | 32 | 8 | 2 |
| 4 | 96 | 32 | 8 | 2 |
| 5 | 96 | 32 | 8 | 2 |
| 6 | 96 | 32 | 8 | 2 |
| 7 | 96 | 32 | 8 | 2 |

Connection X will have a bumping priority equal to the last connection hold priority used in the route calculation. In the above example, the bumping priority will be 1. Once the reservation request arrives at node 301, it will compare the bumping priority to the values in the table. Since connection Y has a connection hold priority of 0, connection X cannot bump connection Y. A failure indication will be sent to the head-end of connection X, and a new route must be calculated.

Figure 3:
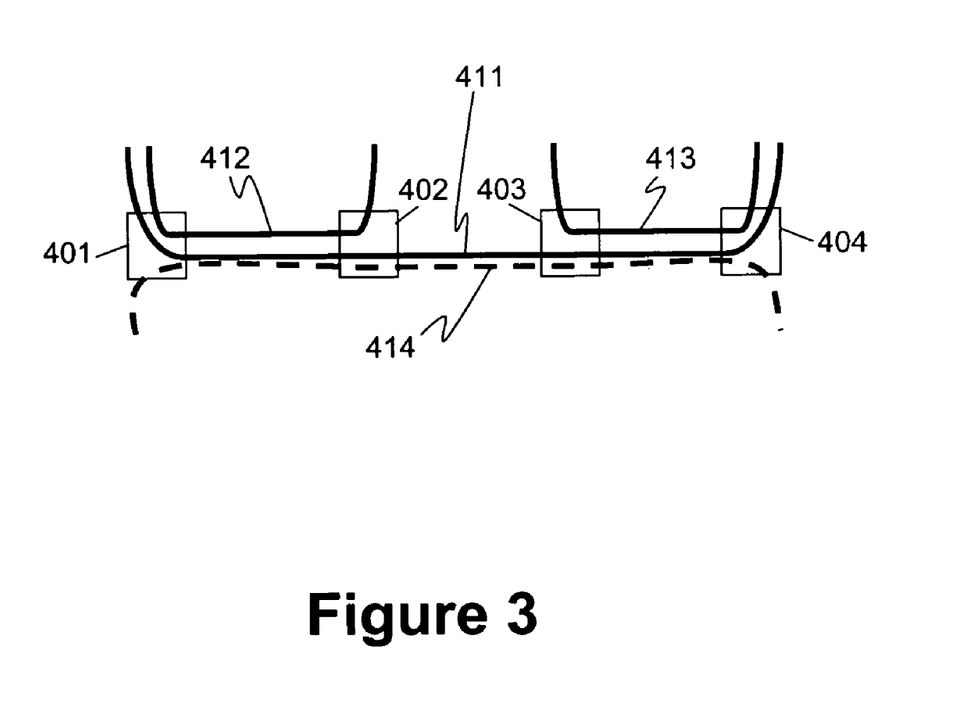
FIG. 3 is a block diagram of a set of interconnected nodes and interconnection paths according to an embodiment of the invention.

A more elaborate example is illustrated in FIG. 3, which considers the problem of what occurs if a connection cannot bump an intermediate node. In this configuration, connection 411 has a connection hold priority of 4, connection 412 has a connection hold priority of 3, and connection 413 has a connection hold priority of 2. Assume another connection 414 with a CSP of 2 is to be setup from nodes 401 to 404, and no free bandwidth is available. If connection 414 is set-up starting at node 401, then connection 411 may be bumped in order to obtain an end-to-end route from node 401 to node 404.

If the connection hold priority of connection 411 is equal to or greater than 2, then connection 412 may be bumped because its priority is less than to connection 414, but the connection 413 cannot, since it has an equal priority to connection 414. Therefore, no bumping shall occur until the complete path has been reserved.

In the example above, if connection 411 is t be bumped, then the sub-network connections also need to be taken down before the sub-network connection of the new connection 414 may be created. Sub-network connections at both ends of a link need to be completely bumped before the sub-network connections of the new connection are added.

In the example in FIG. 3, the complete path through nodes 401, 402, 403, and 404 is identified and reserved, and sub-network connections are reserved for bumping. Reserved for bumping sub-network connection cannot be bumped by another connection other than the one which did the reservation; and reserved sub-network connections cannot be bumped. Only complete sub-network connections may be bumped.

When the complete path has been reserved, then the sub-network connections will be bumped if they require it. Bumping will not be required if a link between the nodes with unused bandwidth exists. In our example in FIG. 3, node 404 will send a bumping request to node 403. Once that is complete, node 404 may set up its sub-network connection. Node 403 may set up its connection when it receives notification from node 402 that bumping has completed. This method allows for parallelization of bumping and connection setup.

Once the connection is bumped, the head-end node needs to be informed of this. When a connection is bumped, the complete end-to-end connection is released and finding a new path will be attempted. In FIG. 3, this means that connection 411 is bumped at nodes 402 and 403. The Resource Manager will instigate a connection delete toward the head-end 401, and tail end 404.

Virtual Path Setup

Figure 4:
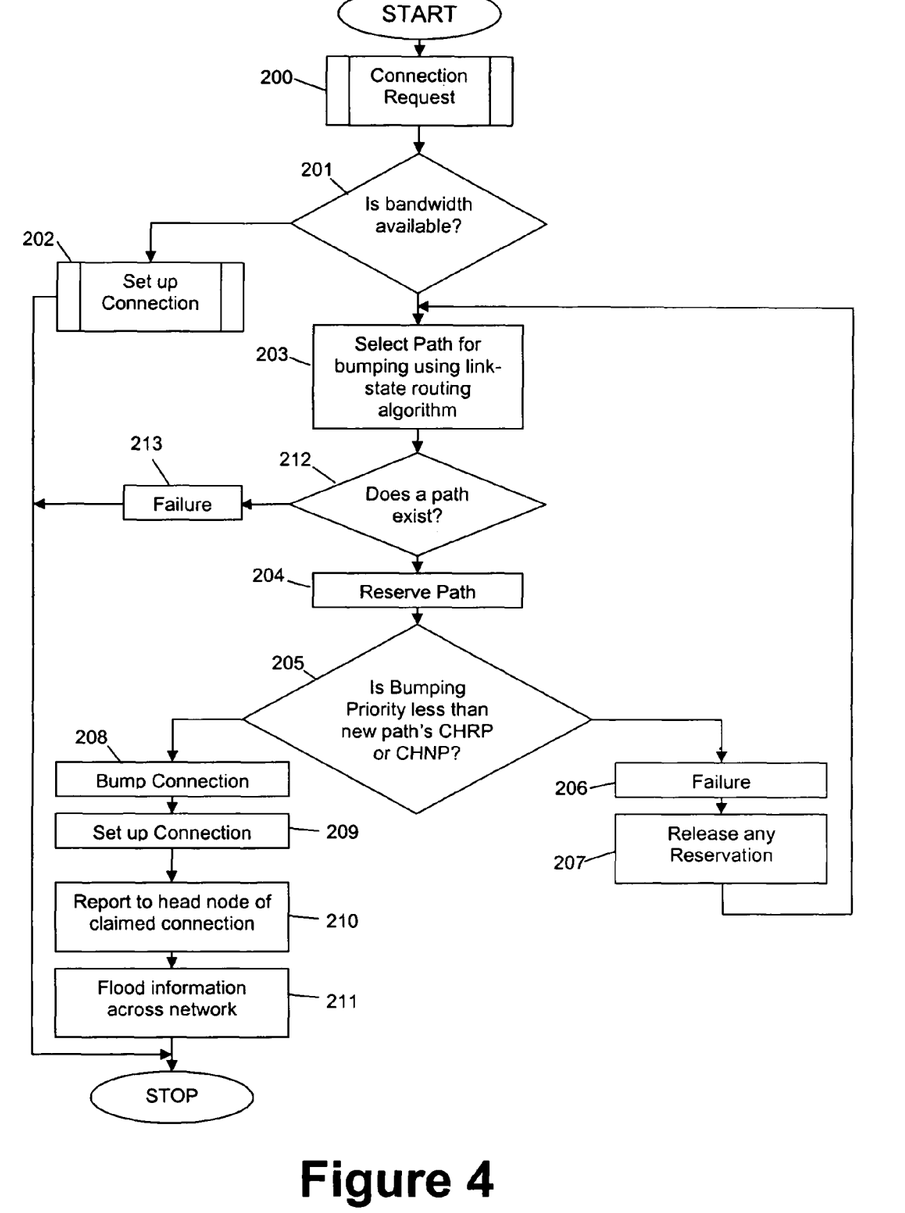
FIG. 4 is a flow diagram illustrating the actions taken by a node during call setup according to an embodiment of the invention.

A flow chart of an implementation of the virtual path setup scheme according to a possible embodiment is given in FIG. 4. Initially, the head node will receive a connection setup request, or connection restoration request (step 200). The head node will first determine if there is bandwidth available (step 201). If there is bandwidth available, the connection is set up (step 202). If no bandwidth is currently available, a path will be chosen which has lower priority connections on that path (step 203).

Should this path not exist (step 212), a failure indication (step 213) will be reported to the head node.

If this path exists, the path will be reserved (step 204). In order to guard against a race condition where another connection claims the path before the reservation request arrives, a bumping priority is compared to the CHNP or CHRP of any connection to be bumped on the path (step 205).

If the bumping priority is less than or equal to any CHNP or CHRP of a connection on the path, a failure indication is reported to the head node (step 206), and any intermediate reservations are released (step 207). Control then returns to step 203 to choose another path.

If the bumping priority is greater than all CHNP or CHRP of the connections on the path, the reserved connections will be bumped in order to free bandwidth for the new connection (step 208). The new connection will claim the connection for itself (step 209), and report to the head node of any claimed connection that its connection has been appropriated (step 210). The information regarding this new connection, i.e. the resources available on each node for connections, will be flooded across the network (step 211).

Connection Restoration in Order of Priority

Switching a connection to a restoration path is mostly done revertive. It is contemplated that restoration may become non-revertive. In case of revertive switching, a connection can be in a restored state and it has a CHRP. In case of non-revertive switching, the restored path has become the new nominal path for this call and hence the connection is subject to the same bumping rules as for connections routed on its nominal path, i.e. it has a CHNP. Therefore, whether restoration is revertive or non-revertive does not affect bumping behavior.

In one aspect of the invention, the node reporting failure may stagger the failure reporting to the head-end node in time, such that the highest priority connections may be restored first. The delay in time between reporting failures can be changed by the network operator.

Re-Use of Bandwidth

When a restored connection is bumped, it will take down its path and the freed up bandwidth will be available for other connection requests, as described above. However, when a connection has failed and is restored, then the nominal path needs to be reserved for when the failure has been corrected and the connection can be reverted back to the nominal path after the WTR has been expired.

Reuse of the nominal path may be desired so as to reduce the use of bandwidth for restoration purposes. In one aspect of the invention, an option would be to temporarily lower the priority of the failed nominal path. That path would then become available for restoration of connections, including the just failed connection. When the failure is repaired and the connection should be reverted back to its original path, then connections occupying the nominal path may be bumped.

Figure 5A:
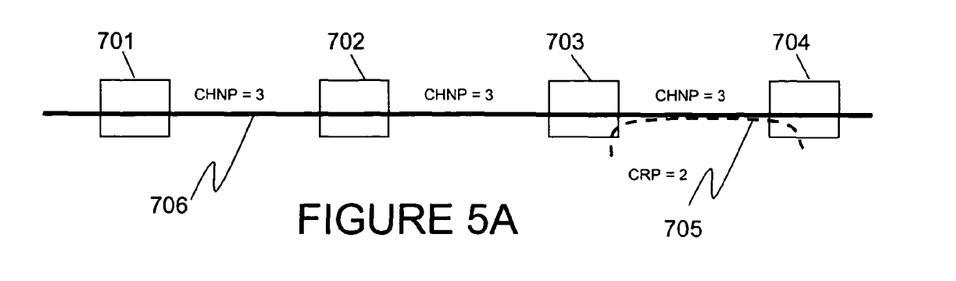
FIGS. 5A, 5B, and 5C are a block diagram of illustrative connection paths according to an embodiment of the invention.
Figure 5B:
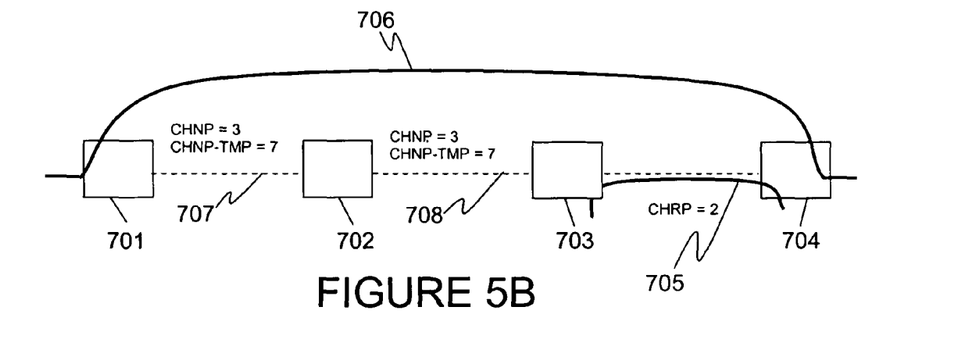
Figure 5C:
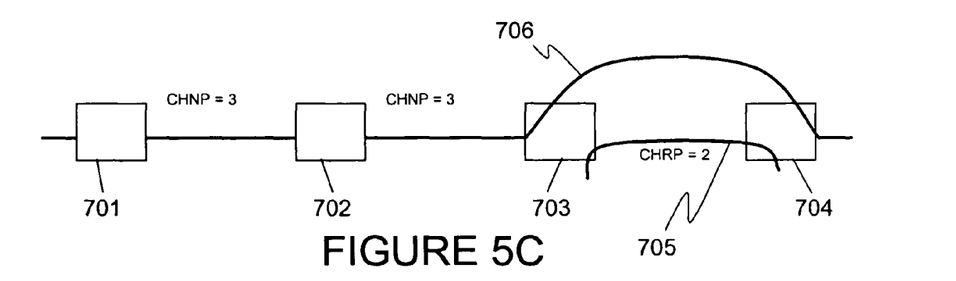

In another embodiment of the invention, FIGS. 5A, 5B, and 5C depict an example of a virtual path 706 consisting of connections 707, 708 and 705 between nodes 701, 702, 703 and 704 according to an embodiment of the invention.

In the top drawing of the exemplary virtual path FIG. 5A, proposed connection 705 will bump sub-network connections of virtual path 706 at nodes 703 and 704, due to the priority settings as indicated if no other bandwidth is available.

In the middle drawing of FIG. 5B, connection 705 has bumped the sub-network connections of connection 706 at nodes 703 and 704. Bandwidth on links 707 and 708 may now be made available for other restoration attempts. This is done by temporarily reducing the bandwidth to the lowest priority level, in this embodiment of the invention, 7. Connections using this temporarily available bandwidth should be aware that they will be bumped if their holding priority is lower than the permanent holding priority.

In one embodiment of the invention, the temporarily available bandwidth is added to the local pool of available bandwidth and will be distributed throughout the network as per flooding rules. The difference between CHNP and CHNP-TMP can be distinguished at the local node when the timeslot is assigned. If temporary bandwidth is not flooded separately from the regular available bandwidth, the head-end node may not be able to determine whether a path is routed over temporarily available bandwidth, while a slightly longer path may be available using non-temporarily available bandwidth.

In an alternate embodiment of the invention, the above approach can also be used for bandwidth optimization when restoring a connection. For instance assume that is desirable that connection 706 be restored and re-use its nominal path as much as possible. It can do this, because the routing software will allow it to use the bandwidth, whose priority has been reduced to 7 (as per the example above). The 706 connection will then be restored as illustrated in the bottom drawing of FIG. 5C.

This makes excellent use of the bandwidth. Note that there is no bridge/switch done at nodes 703 or 704. The connection has been rerouted from the head-end to the tail-end. The drawback of this approach is that the connection cannot be revertive back by bridging at the head-end 701 and tail-end nodes 704. Therefore, in this embodiment of the invention, a connection should not re-use its own path. If two connections would fail or be bumped, then they can use each other's nominal path and at least one of them can do a 'hitless' reversion back to its nominal path. The other will be bumped of its restored path by the reversion action of the first one.

In another alternate embodiment of the invention, an approach would be to implement bridge/switch functionality at the nodes where restored path begins and ends (nodes 703 and 704 in the example above). In that case revertive action is always 'hitless'. To prevent misconnections, the reversion back shall always be coordinated to ensure the complete nominal path has been reclaimed.

Connections in WTR State

While a restored path is in the WTR state, it potentially does not need that path anymore. Similarly as in protection switching, the WTR can be cancelled (resulting in immediate reversion) when the path in WTR state is required for another restoration attempt. This too can be achieved using priority settings.

When a call enters WTR, it signals along its restored path to reduce the CHRP to its lowest priority level. Any other connection requiring this path can then take it. One approach would be to allow bumping of the restored connection, according to the embodiment of the invention. This would mean that traffic will be interrupted when the WTR is cancelled and traffic is bumped back the (not failed) nominal path. In an alternate embodiment of the invention, another method would be to first switch traffic back the nominal path before bumping occurs. Unless this is implemented for all bumping, this would mean that a connection in WTR state requires special behavior.

The above behavior for connections in the WTR state should be valid for when the WTR timer is not set to infinite (99). When the WTR timer is set to infinite, then the network operator wants to control the reversion back to the nominal path. The CHRP of the restored connection with an infinite WTR timer should not be changed.

Connection Path Reservation

The embodiment of this invention allows a form of path reservation. For instance a call needs to be setup, but the connections of this call need to be tested first. One method to do this is by setting up the connection with a low CHNP. This allows this connection to be bumped if the path is required for higher priority connections. After the connection has been tested, its CHNP shall be set to the appropriate value.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for establishing, in an optical network having a plurality of physical paths between a plurality of nodes and a first virtual path (VP) with a first associated priority comprising at least one connection between a head node and an end node running on a first physical path in said optical network, a second VP having a second associated priority, the method comprising the steps of:
   (a) at one of the nodes of the optical network, identifying a second physical path, wherein
      (i) said second physical path is one of said plurality of physical paths, (ii) said second physical path is between a first node and a second node of said nodes;
(iii) said second physical path comprises said at least one connection, and
(iv) said second associated priority is greater than said first associated priority;
(b) at one of the nodes of the optical network, bumping said at least one connection; and
(c) at one of the nodes of the optical network, allocating said at least one connection to said second VP;
wherein said associated second priority comprises:
(a) a priority profile, wherein
(b) said priority profile comprises a plurality of priority types, and
(c) said priority type comprises a plurality of priority levels;
wherein said priority types comprises at least one of the groups consisting of a connection priority and a hold priority;
wherein said priority types comprises at least one of the groups consisting of Call Setup Priority (CSP), Call Restoration Priority (CRP), Call Hold Nominal Path Priority (CHNP), and Call Hold Restoration Priority (CHRP); and
wherein the second associated priority further comprises:
(a) said CRP is greater than said CSP,
(b) said CRP is less than or equal to said CHRP, and
(c) said CSP is less than or equal to said CHNP.

2. The method of claim 1, wherein the second associated priority further comprises:
(d) said CRP is less than or equal to each of said CHNP and said CHRP, and
(e) said CSP is less than or equal to each of said CHNP and said CHRP.

3. The method of claim 2, further comprising the step of:
(a) at one of the nodes of the optical network, storing a bumping priority value equal to the last priority level used in said using step.

4. The method of claim 3, further comprising the steps of:
(a) at one of the nodes of the optical network, restoring said at least one connection on said first VP, wherein
(i) restoring said at least one connection is establishing a VP, wherein
(1) said head node and said end node of said first VP are the same as the first node and the second node on a new VP.

5. The method of claim 4, wherein said restoring step further comprises the step of:
(a) at one of the nodes of the optical network, if any of said connections is a nominal VP,
(i) storing information comprising said at least one connection on said first node.

6. The method of claim 1, wherein at least one of steps (a) to (c) is performed at the head node.

7. A method for establishing, in an optical network having a plurality of physical paths between a plurality of nodes and a first virtual path (VP) with a first associated priority comprising at least one connection between a head node and an end node running on a first physical path in said optical network, a second VP having a second associated priority, the method comprising the steps of:
(a) at one of the nodes of the optical network, identifying a second physical path, wherein
(i) said second physical path is one of said plurality of physical paths,
(ii) said second physical path is between a first node and a second node of said nodes,
(iii) said second physical path comprises said at least one connection,
(iv) said second associated priority is greater than said first associated priority, and
(v) using a path selection algorithm for identifying said second physical path;
(b) at one of the nodes of the optical network, bumping said at least one connection; and
(c) at one of the nodes of the optical network, allocating said at least one connection to said second VP;
wherein said path selection algorithm further comprises the steps of:
(d) for all priority levels less than said associated second priority, at one of the nodes of the optical network, proceeding from a highest or lowest unassessed priority level to a lowest priority level or said associated second priority, respectively,
(e) at one of the nodes of the optical network, assessing whether said second physical path exists from said first node to said second node, wherein
(i) said assessing step uses a routing algorithm and a priority level for finding said second physical path,
(f) at one of the nodes of the optical network, if said second physical path exists,
(i) if said physical path is a shared mesh tunnel,
(1) assessing whether said second physical path exists from said first node to said second node, using a routing algorithm and a next lower unassessed priority level for finding a lower priority path,
(ii) if said physical path is not a shared mesh tunnel,
(1) stopping said calculation, and
(g) at one of the nodes of the optical network, if said second physical path does not exist,
(i) assessing whether said physical path exists from said first node to said second node, using a routing algorithm and the next lower or higher unassessed priority level for finding a lower or higher priority path, respectively,
(h) at one of the nodes of the optical network, if said second physical path is not found and all priority levels less than or equal to said associated second priority have been assessed,
(i) reporting a failure indication to said first node.

8. The method of claim 7, wherein at least one of steps (a) to (h) is performed at the head node.

9. A method for establishing, in an optical network having a plurality of physical paths between a plurality of nodes and a first virtual path (VP) with a first associated priority comprising at least one connection between a head node and an end node running on a first physical path in said optical network, a second VP having a second associated priority, the method comprising the steps of:
(a) at one of the nodes of the optical network, identifying a second physical path, wherein
(i) said second physical path is one of said plurality of physical paths,
(ii) said second physical path is between a first node and a second node of said nodes;
(iii) said second physical path comprises said at least one connection, and
(iv) said second associated priority is greater than said first associated priority;
(b) at one of the nodes of the optical network, signaling a path reservation request down said second physical path, including a bumping priority;
(c) at one of the nodes of the optical network, comparing said bumping priority to said associated first priority; and (d) at one of the nodes of the optical network, if said bumping priority is greater than or equal to said associated first priority,
   (i) reporting a failure indication to said head node of said first VP,
   (ii) releasing said reservations, and
   (iii) returning to step (a),
(e) at one of the nodes of the optical network, if said associated first priority is less than said bumping priority,
   (i) reserving said second physical path
(f) at one of the nodes of the optical network, bumping said at least one connection; and
(g) at one of the nodes of the optical network, allocating said at least one connection to said second VP.

10. The method of claim 9, wherein at least one of steps (a) to (g) is performed at the head node.

11. A method for establishing, in an optical network having a plurality of physical paths between a plurality of nodes and a first virtual path (VP) with a first associated priority comprising at least one connection between a head node and an end node running on a first physical path in said optical network, a second VP having a second associated priority, the method comprising the steps of:
(a) at one of the nodes of the optical network, identifying a second physical path, wherein
   (i) said second physical path is one of said plurality of physical paths,
   (ii) said second physical path is between a first node and a second node of said nodes;
   (iii) said second physical path comprises said at least one connection, and
   (iv) said second associated priority is greater than said first associated priority;
(b) at one of the nodes of the optical network, bumping said at least one connection; and
(c) at one of the nodes of the optical network, allocating said at least one connection to said second VP;
(d) at one of the nodes of the optical network, detecting a connection failure on a physical path associated with said second VP, wherein
   (i) said second VP comprises a WTR timer for waiting to restore said second VP
(e) at one of the nodes of the optical network, detecting that said connection failure is repaired;
(f) at one of the nodes of the optical network, detecting that a waiting for response (WTR) timer has expired;
(g) at one of the nodes of the optical network, changing said associated second priority of said restored physical path for making connections available;
(h) at one of the nodes of the optical network, flooding information about said changed associated second priority across said optical network, keeping it separate from the regularly available connections; and
(i) at one of the nodes of the optical network, restoring said second VP to its previous physical path.

12. The method of claim 11, after said restoring step, further comprising the step of:
(a) at one of the nodes of the optical network, changing said changed associated second priority of said failed VP to said associated second priority of said second VP.

13. The method of claim 11, wherein at least one of steps (a) to (i) is performed at the head node.

\* \* \* \* \*